United States Patent
Kaufman

(10) Patent No.: US 6,596,997 B2
(45) Date of Patent: Jul. 22, 2003

(54) RETRO-REFLECTOR WARM STOP FOR UNCOOLED THERMAL IMAGING CAMERAS AND METHOD OF USING THE SAME

(75) Inventor: Charles S. Kaufman, Long Beach, CA (US)

(73) Assignee: Irvine Sensors Corporation, Costa Mesa, CA (US)

( * ) Notice: Subject to any disclaimer, the term of this patent is extended or adjusted under 35 U.S.C. 154(b) by 0 days.

(21) Appl. No.: 09/921,525

(22) Filed: Aug. 3, 2001

(65) Prior Publication Data

US 2003/0025083 A1 Feb. 6, 2003

(51) Int. Cl.⁷ .................................................. G01J 5/08
(52) U.S. Cl. ........................ 250/353; 250/352
(58) Field of Search ............................... 250/353, 352, 250/338.4

(56) References Cited

U.S. PATENT DOCUMENTS

| | | | | |
|---|---|---|---|---|
| 4,820,923 A | * | 4/1989 | Wellman | 250/353 |
| 4,972,085 A | * | 11/1990 | Weber et al. | 250/352 |
| 4,990,782 A | * | 2/1991 | Wellman et al. | 250/353 |
| 5,444,250 A | * | 8/1995 | Hanke | 250/352 |

* cited by examiner

Primary Examiner—Constantine Hannaher
Assistant Examiner—Albert Gagliardi
(74) Attorney, Agent, or Firm—Myers Dawes Andras & Sherman LLP; Joseph C. Andras

(57) ABSTRACT

The illustrated embodiment of the invention is an improvement to an infrared camera in which an uncooled warm stop is provided which includes an array of miniature retro-reflectors on its rear surface oriented toward the detector in the camera and away from the exterior light source of interest instead of having a diffuse (i.e., Lambertian or white) or specular (i.e., mirror-like) reflector on the rear or interior surface of the warm stop.

21 Claims, 2 Drawing Sheets

Cold Shield

Retro-Reflector    Diffuse Reflector    Specular Reflector

RETRO-REFLECTOR WARM STOP FOR UNCOOLED THERMAL IMAGING CAMERAS AND METHOD OF USING THE SAME

BACKGROUND OF THE INVENTION

1. Field of the Invention

The invention relates to the field of infrared cameras and in particular to infrared cameras employing a warm shield.

2. Description of the Prior Art

Thermal imaging cameras are based on the detection and discrimination of infrared (IR) radiation. The thermal imaging process is based on IR radiation that is emitted from all non-reflective objects, where the amount of IR radiation emitted increases as the temperature of the object increases. Thermal imaging cameras use special IR optics to focus IR radiation onto special IR detectors or IR detector arrays. To optimize the performance of these detector arrays a baffle or shield is used to limit incoming IR radiation to the IR radiation that is collected and focused by the IR optics, see FIG. 1. As shown in FIG. 1, the cold shield blocks or vignettes the detector array's view to optical paths that do not come from the collection optics. For this shield to be effective, the shield's IR signature has to be smaller to the IR signature that is blocked by the cold shield. This means the IR signature of the shield or baffle needs to be either smaller or more stable as compared to the IR "noise" signature from the non-optical paths.

Historically, IR detector arrays required cryogenic cooling and the detector was placed in a dewar, which is essentially a thermos bottle with an IR transparent window. Since cooling was readily available, the general approach was to use a shield or baffle with a high emissivity (>98%), place this shield in the dewar directly above the IR detector array usually at either an aperture or a field stop to optimize the efficiency of the baffling and keep this shield at the same cryogenic temperature as the IR detector array. The result was the shield had a much smaller IR radiation signature as compared to unwanted stray IR radiation.

There are two basic limitations associated with the historic approach of using a As cold shield to baffle a thermal detector. The first limitation is some newer IR detector materials (e.g., ferroelectric, micro-bolometer, pyroelectric) do not require cooling so a refrigeration source is not readily available as a cooling source to cool the IR baffle or shield. There is a strong desire to eliminate cooling in the IR camera to reduce complexity, power consumption and/or size of the camera, and adding cooling just for the baffle would negate the benefits of using an IR detector that can operate without cooling.

The other limitation is a traditional cold shield is usually placed within the dewar assembly. This requires that the shield or baffle be small (less than an inch) and mechanically rigid. This limits the optics to operating with a fixed f number or f-stop. Limiting operations to a fixed f-stop is sometimes detrimental. A variable f-stop is often desired for using aperture-optimized zoom or variable magnification optics. A variable f-stop is also sometimes desired to limit exposure when the signal is exceedingly bright or when there is a desire to have a deeper depth of focus.

The traditional design alternative to high emissivity cold shield is a high reflectivity warm shield or stop. Since a traditional warm shield has a high reflectivity ($\rho$), this implies that is has a low emissivity ($\epsilon$) since $\epsilon = 1 - \rho$. A traditional warm shield has little, if any, IR emission. Instead it reflects IR radiation from other sources. The problem with a traditional reflective IR warm stop is that stray IR radiation can still reach the detector. It just has to reflect off the warm stop instead of illuminating the detector directly.

A simple analogy would be trying to keep the one end of a hallway dark by linings the wall and covering the windows with mirrors instead of painting the walls and windows black. The problem is if there is a window around the corner, that window could still illuminate end of the hallway by bouncing light off of the mirror lining in the hallway.

What is needed is some kind of noncryogenic means which can be used to avoid stray IR impinging on the detector, but without the reflective problems of the traditional warm shield.

BRIEF SUMMARY OF THE INVENTION

The invention is an improvement in a camera for imaging light from a source comprising a detector element or a detector array. An uncooled light shield is interposed between the detector element and the source to block all light from reaching the detector element other than light directly transmitted from the source into the detector element without reflection from any portion of the camera. The efficiency is optimized if the light shield is placed at either a field or an aperture stop and/or the surface between the light shield and detector array is a specular reflector. The light shield has an interior surface oriented toward the detector element and an opposing exterior surface oriented toward the source. An array of retroreflectors is disposed on the interior surface.

In the illustrated embodiment the array of retroreflectors comprises an array of corner cube reflectors. The interior surface is highly reflective to light or has a low emissivity at least within the range of interest detected by the detector array. The light shield has an aperture defined therethrough which allows light to pass through the aperture and to directly impinge on the detector element without reflection within the camera. The improvement further comprises optics which are arranged and configured to collect light from the source and to focus the light on the detector element.

The illustrated embodiment contemplates that the detector element, light shield, optics and array of retroreflectors are operable at infrared frequencies of light. However, the invention is not limited to infrared use, but my be employed at any optical frequency.

The invention includes a method of providing a camera with the above design and further a method of collecting light and delivering it to an imaging detector using the combination of elements described above.

While the invention may have in part been described for the sake of grammatical fluidity as elements for the performance of functional objects, it is to be expressly understood that the claims are not to be construed as necessarily limited in any way by the construction of "means" or "steps" limitations under 35 USC 112, but to be accorded the full scope of the meaning and equivalents of the definition provided by the claims whether by the judicial doctrine of equivalents or by statutory equivalents under 35 USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 1:
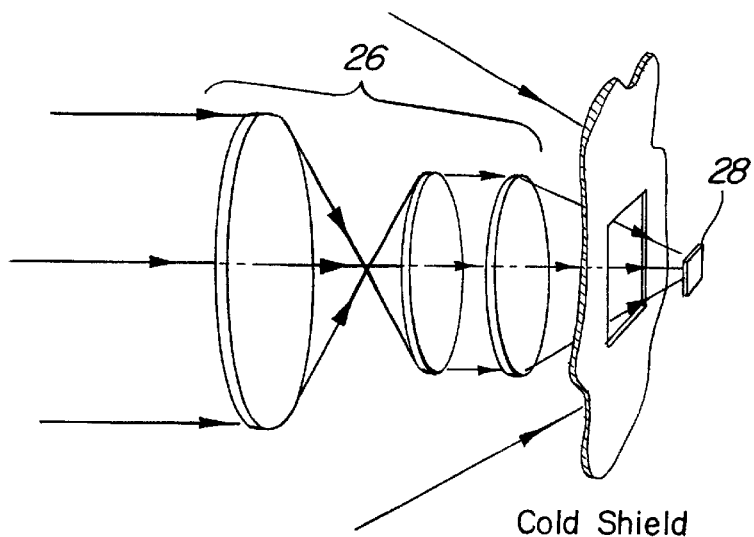
FIG. 1 is a diagrammatic depiction of the principle elements of a prior art cold shield.
Figure 2:
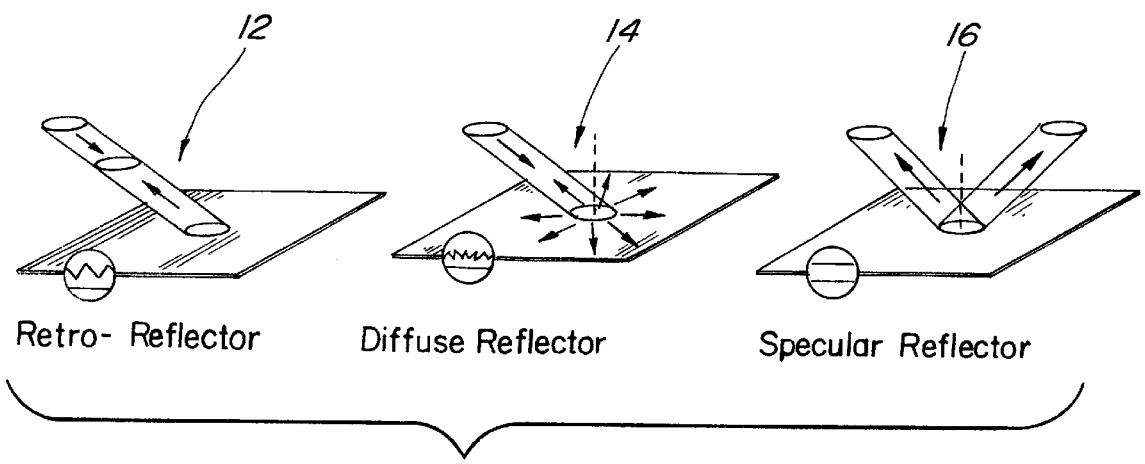
FIGS. 2a, 2b and 2c are diagrammatic depictions illustrating the functional performance of a retroreflector, a diffuse reflector and a specular reflector.

The illustrated embodiment of the invention is based on constructing a warm stop 10 from an array of miniature retro-reflectors instead of a diffuse (i.e., Lambertian or white) or specular (i.e., mirror-like) reflector. A retroreflector 12 reflects light back along its incoming path as diagrammatically shown in FIG. 2a. The reflection of a retroreflector 12 is independent of the incident angle or incoming angle of the light. A diffuse reflector 14 reflects light in all directions as diagrammatically shown in FIG. 2b. A specular or mirror-like reflector 16 reflects light based on its incoming or incident angle as shown in FIG. 2c.

Figure 3:
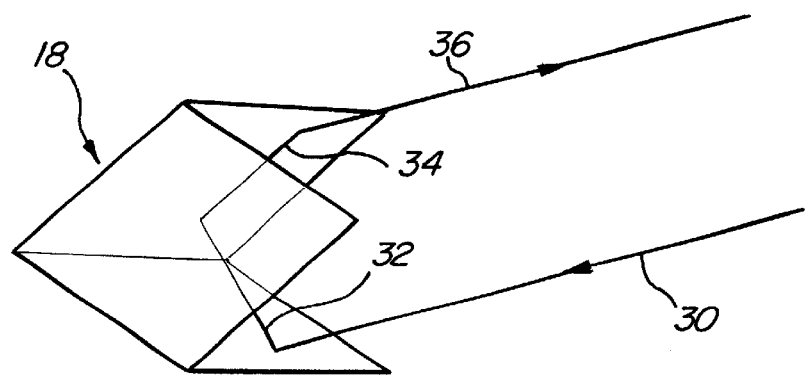
FIG. 3 is a diagrammatic depiction of a corner cube retroreflector.

In the preferred embodiment the optical stop is constructed of an array 20 of prismatic corner cubes 18, one of which is diagrammatically shown in FIG. 3. Prismatic corner cube 18 is similar to an injected plastic molded array of corner cubes used as "bicycle" reflectors. Retroreflector or corner cube 18 as shown in FIG. 3 is comprised of three specular surfaces forming the interior corner of a cube so that an incident ray 30 from any direction will in no more than two reflected rays 32 and 34 be reflected off the three corner reflector surfaces to be returned in ray 36 in a direction parallel to the incident ray 30. Corner cubes and retroreflectors 18 are well known to the art and any design for such corner cubes or retroreflectors 18 now known or later devised is expressly contemplated as within the scope of the invention.

Detector array 28 is typically included in a light-tight camera housing (not shown) which also includes IR optics 26 and warm stop 10 as described below. The temperature of the housing itself and incident IR light scattered within the housing by optics 26 or any other means creates multiply reflected IR rays propagating toward detector 28, which would otherwise comprise part of the noise added to the intend IR signal, but for warm stop 10. Thus, warm stop 10 is positioned within the camera housing according to well understood conventional design principles to shield detector 28 from most or all of the IR light scattered or originated within the housing, which IR light arises from any source other than IR light collected from the exterior source of interest along the intended primary light path of optics 26. These design principles include placing the warm stop at either a field or an aperture stop of the optical assembly. Thus, detector 28 will see at most the desired collected light signal and IR light originated on the backside of warm stop 10 and an immediate restricted volume within the camera housing about detector 28.

Figure 4:
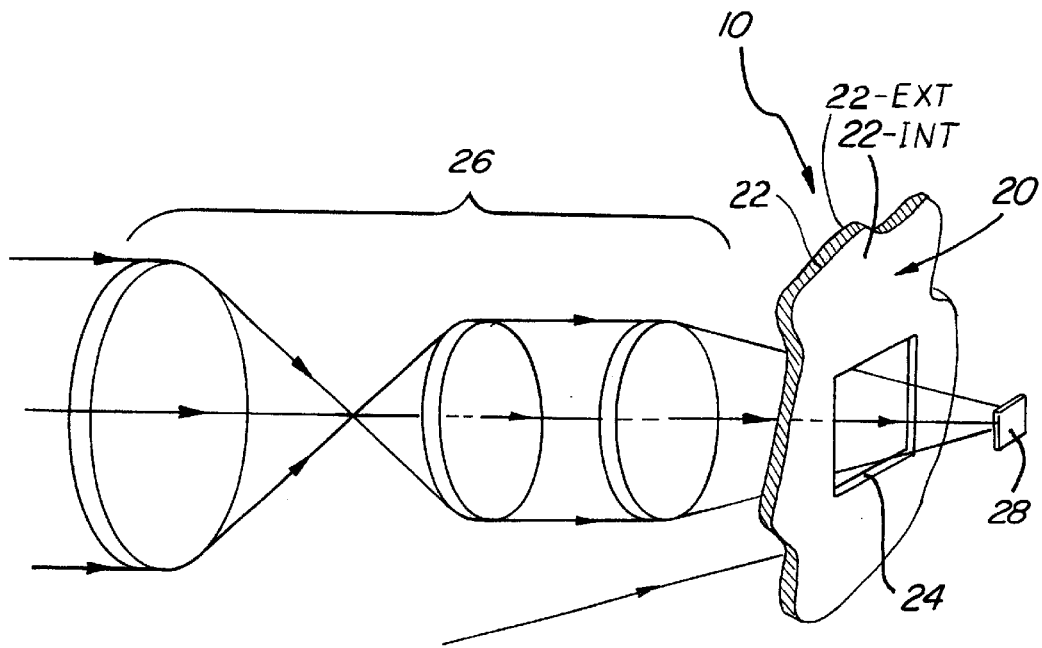
FIG. 4 is a diagrammatic depiction of the principle elements of the warm stop of the invention.

To support operation over the thermal imaging IR spectral band, array 20 of corner cubes 18 comprise a rear or interior surface reflector on shield or warm stop 10. The reflective coating formed by array 20 is the top or interior surface 22-INT of a substrate 22 which surface is directed toward the detector as shown in FIG. 4. To perform the optical baffle function, a precision sized aperture 24 in center of the array 20 of corner cubes 18 is defined through substrate 22 to allow access to a focused light bundle from the conventional IR optics 26. The exterior surface 22-EXT of substrate 22 oriented toward the incoming light is provided with a highly absorptive and low emissivity coating or surface, such as a conventional IR absorbing paint. The entire immediate restricted volume within the camera housing about detector 28 is provided with a highly specular reflective and low emissivity coating or surface.

Array 20 of corner cubes 18 are formed by any one of several well known methods in the art including, but not limited to, micromachining corner cubes 18 into the interior surface 22-INT of substrate 22 forming at least the portion of warm stop 10 in the proximity of aperture 24 and oriented toward detector 28. Array 20 of corner cubes 18 could also be molded into substrate 22 or formed in any manner in a layer disposed onto substrate 22. For example, a preformed array 20 on a layer which is adhesively attached to the interior surface 22-INT of substrate 22 could be employed, or a moldable layer could be disposed onto the interior surface 22-INT of substrate 22 and then corner cubes 18 impressed by a die into the layer after which it is cured. The invention is not limited in any manner by the intrinsic nature of array 20 of retroreflectors 18 or the manner in which it is formed or may be attached to or disposed into or onto substrate 22.

The benefits of this concept are as follows: The effect of off-axis stray IR radiation will be fixed and solely dependent on the operating temperature of the IR detector or IR detector array 28. This thermal optical baffle or warm stop 10 will require no cryogenic cooling. The performance of the optical baffle 10 will not be affected by secondary or multi-path reflections.

Since the invention eliminates the need for a dewar and cooling, it results in the significant reduction of size and power consumption of a camera sensor based on this implementation. Since this invention allows the inclusion of a passive optical baffle 10, the performance of the system (reduction of noise and hence improved sensitivity) is improved as compared to a sensor with no baffling.

The invention provides a compact, passive commercially viable approach to provide thermal baffling of IR detector and IR detector arrays without using cooling and is impervious to secondary reflections. This device has reduced the size, weight and power consumption of thermal imaging cameras and thermal sensor based on uncooled IR while improving performance reliability. The use of this retroreflective warm stop/baffle 10 results in the elimination of cooling the optical stop 10 while effectively blocking the effect of stray IR radiation.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

I claim:

1. An improvement in a camera for imaging light from a source comprising:
   a detector element;
   an uncooled light shield interposed between said detector element and said source to block all light from reaching said detector element other than light directly transmitted from said source into said detector element without reflection from any portion of said camera, wherein said light shield has an interior surface oriented toward said detector element and an opposing exterior surface oriented toward said source; and
   an array of retroreflectors disposed on said interior surface.

2. The improvement of claim 1 where said array of retroreflectors comprise an array of corner cube reflectors.

3. The improvement of claim 1 where said exterior surface is highly absorptive to light.

4. The improvement of claim 1 where said light shield has an aperture defined therethrough which allows light to pass through said aperture directly impinging on said detector element without reflection within said camera.

5. The improvement of claim 1 further comprising optics which are arranged and configured to collect light from said source and to focus said light on said detector element.

6. The improvement of claim 5 where said light shield has an aperture defined therethrough which allows light to pass through said aperture directly impinging on said detector element without reflections within said light detector and where said optics focuses light onto said aperture.

7. The improvement of claim 5 where said optics is operable at infrared frequencies of light.

8. The improvement of claim 1 where said exterior surface of said light shield is characterized by a low reflective surface.

9. The improvement of claim 1 where said exterior surface of said light shield is characterized by a highly absorptive surface.

10. The improvement of claim 1 where said detector element, light shield, and array of retroreflectors are operable at infrared frequencies of light.

11. An improvement in a method for imaging light from a source comprising:
    providing an uncooled light shield interposed between a detector element and said source to block all light from reaching said detector element other than light directly transmitted from said source into said detector element without reflection from any portion of said light detector, wherein said light shield has an interior surface oriented toward said detector element and an opposing exterior surface oriented toward said source; and
    providing said light shield with an array of retroreflectors disposed on said interior surface.

12. The improvement of claim 11 where providing said light shield with an array of retroreflectors comprises providing an array of corner cube reflectors.

13. The improvement of claim 11 where providing an uncooled light shield provides a light shield with said exterior surface characterized as highly absorptive to light.

14. The improvement of claim 11 where providing an uncooled light shield provides said light shield with an aperture defined therethrough which allows light to pass through said aperture directly impinging on said detector element without reflections within said light detector.

15. The improvement of claim 11 further comprising providing optics which are arranged and configured to collect light from said source and to focus said light on said detector element.

16. The improvement of claim 15 where providing an uncooled light shield provides said light shield with an aperture defined therethrough which allows light to pass through said aperture directly impinging on said detector element without reflections within said light detector and where said optics focuses light onto said aperture.

17. The improvement of claim 15 where providing said optics provides optics which are operable at infrared frequencies of light.

18. The improvement of claim 11 where providing an uncooled light shield provides said exterior surface of said light shield with a low reflective surface.

19. The improvement of claim 11 where providing an uncooled light shield provides said exterior surface of said light shield with a highly absorptive surface.

20. The improvement of claim 11 where providing an uncooled light shield provides light shield and array of retroreflectors operable at infrared frequencies of light.

21. An improvement in a method for imaging light from a source comprising the steps of:
    collecting light from said source;
    selecting collected light from said source by means of an uncooled light shield interposed between a detector element and said source to block all light from reaching said detector element other than light directly transmitted from said source into said detector element without reflection from any portion of said light detector, wherein said light shield has an interior surface oriented toward said detector element and an opposing exterior surface oriented toward said source; and reflecting unwanted light away from said light shield by means of an array of It retroreflectors disposed on said interior surface.

* * * * *